(12) United States Patent
Cheng et al.

(10) Patent No.: US 8,970,149 B2
(45) Date of Patent: Mar. 3, 2015

(54) MOTOR CIRCUIT WITH POWER-OFF BRAKING FUNCTION

(75) Inventors: Chung-Ken Cheng, Kaohsiung (TW); Shou-Chien Chang, Kaohsiung (TW); Chieh-Jen Yang, Kaohsiung (TW)

(73) Assignee: Sunon Electronics (Kunshan) Co., Ltd., Kunshan, Jiangsu (CN)

( * ) Notice: Subject to any disclaimer, the term of this patent is extended or adjusted under 35 U.S.C. 154(b) by 272 days.

(21) Appl. No.: 13/619,037

(22) Filed: Sep. 14, 2012

(65) Prior Publication Data

US 2013/0271045 A1 Oct. 17, 2013

(30) Foreign Application Priority Data

Apr. 11, 2012 (CN) .......................... 2012 2 0149536

(51) Int. Cl.
 *H02P 6/14* (2006.01)
(52) U.S. Cl.
 USPC .................................. 318/400.26; 318/400.29
(58) Field of Classification Search
 USPC ....................... 318/400.26, 400.29; 388/907.2
 See application file for complete search history.

(56) References Cited

U.S. PATENT DOCUMENTS

| 5,541,487 | A  | * | 7/1996 | Yorozu ......................... 318/685 |
| 5,818,122 | A  |   | 10/1998 | Miyazawa |
| 6,900,657 | B2 | * | 5/2005 | Bui et al. .................. 324/765.01 |
| 7,027,315 | B2 | * | 4/2006 | Halfmann et al. .......... 363/56.02 |
| 8,018,186 | B2 | * | 9/2011 | Frankel et al. ............ 318/400.29 |
| 8,716,961 | B2 | * | 5/2014 | Ramu ........................... 318/139 |

FOREIGN PATENT DOCUMENTS

TW 201117546 5/2011

* cited by examiner

*Primary Examiner* — Rina Duda
(74) *Attorney, Agent, or Firm* — Muncy, Geissler, Olds & Lowe, P.C.

(57) ABSTRACT

A motor circuit with power-off braking function includes a driving unit, a coil unit, and a braking unit. The driving unit includes a plurality of switch arms connected in parallel, with each switch arm having a series contact. The coil unit includes a plurality of coils and a central contact. Each coil includes an end connected to the series contact of one of the switch arms. The other end of each coil is connected to the central contact. The braking unit includes a brake loop switch coupled between the central contact of the coil unit and an end of the switch arms. When power is cut off, a plurality of brake loops is formed to share the transient current during braking.

11 Claims, 6 Drawing Sheets

MOTOR CIRCUIT WITH POWER-OFF BRAKING FUNCTION

BACKGROUND OF THE INVENTION

1. Field of the Invention

The present invention relates to a motor circuit with power-off braking function and, more particularly, to a motor circuit that can form a plurality of brake loops to share the transient current during braking.

2. Description of the Related Art

FIG. 1 shows a conventional motor circuit with power-off braking function disclosed in Taiwan Patent Publication No. 201117546 entitled "FAN SYSTEM AND STOP CONTROL CIRCUIT THEREOF". The motor circuit includes a driving unit 91, a coil unit 92, a braking unit 93, an energy storage unit 94, and a control unit 95. The driving unit 91 includes two electronic switches M1 and M3 connected in series between a high voltage end and a low voltage end, forming a first arm switch unit 911, with a first series contact S1 located between the electronic switches M1 and M3. The driving unit 91 further includes another two electronic switches M2 and M4 connected in series between the high voltage end and the low voltage end, forming a second arm switch unit 912, with a second series contact S2 located between the electronic switches M2 and M4. Thus, the first and second arm switch units 911 and 912 form the driving unit 91 of a full bridge type. The coil unit 92 is comprised of a coil and includes two ends respectively connected to the first and second series contacts S1 and S2. The braking unit 93 includes a loop actuating switch 931 having a high potential port 931a, a low potential port 931b, and a control port 931c. The high potential port 931a is coupled to the high voltage end, the low potential port 931b is coupled to the first series contact S1, and the control port 931c is coupled to a DC power source VCC of the motor circuit. The energy storage unit 94 is a capacitor and includes a power output 941 connected to the high potential port 931a of the loop actuating switch 931. The control unit 95 is directly or indirectly coupled to and, thus, controls the electronic switches M1, M2, M3, and M4.

In a case that the DC power source VCC normally supplies power to the conventional motor circuit, the control unit 95 controls the electronic switches M1 and M4 to be conductive and controls the electronic switches M2 and M3 to be not conductive, such that the current flows from the first series contact S1 through the coil unit 92 to the second series contact S2. Alternatively, the control unit 95 controls the electronic switches M2 and M3 to be conductive and controls the electronic switches M1 and M4 to be not conductive, such that the current flows from the second series contact S2 through the coil unit 92 to the first series contact S1. Thus, an alternating magnetic field is created by the coil unit 92 through provision of the alternating current, driving a rotor of the motor to rotate. Furthermore, since a difference between the potentials of the high potential port 931a and the control port 931c of the loop actuating switch 931 is small, the loop actuating switch 931 is in an open state. On the other hand, if the power from the DC power source VCC is cut of the control unit 95 stops controlling the electronic switches M1, M2, M3, and M4. In this case, the energy storage unit 94 releases electric energy through the power output 941, such that the loop actuating switch 931 and the electronic switch M2 becomes conductive due to electricity supplied from the energy storage unit 94. By such an arrangement, the coil unit 92, the electronic switch M2 and the loop actuating switch 931 form a closed loop that rapidly absorbs the back electromotive force generated at the coil unit 92 resulting from rotation of the rotor, rapidly stopping the operation of the rotor.

However, since the electronic switch M2 of the second arm switch unit 912 must be switched in a high frequency during normal power supply so as to create the alternating current and since the electronic switch M2 must be in a conductive state during the power-off period so as to form the closed loop, the damage rate of the electronic switch M2 is significantly higher than the other electronic switches M1, M3, and M4. Furthermore, when the DC power source VCC normally supplies power to operate the conventional motor circuit, if the loop actuating switch 931 mistakenly turns into the conductive state due to an electromagnetic effect in the alternating magnetic field, an extra surge current is apt to be created and passes through the electronic switch M3. Namely, the current flowing from the electronic switch M2 through the coil unit 92 passes through the electronic switch M3, and the current flowing through the loop actuating switch 931 also passes through the electronic switch M3, leading to damage to the electronic switch M3.

Thus, a need exists for a novel motor circuit with power-off braking function to avoid tremendous load to a single electronic switch due to absorption of the back electromotive force by a single closed loop during the power-off period and to avoid damage to the electronic switches resulting from erroneous actuation during normal power supply, prolonging the service life of the motor circuit with power-off braking function.

SUMMARY OF THE INVENTION

An objective of the present invention is to provide a motor circuit with power-off braking function that forms a plurality of closed loops when the power is cut off, avoiding damage to an electronic switch due to passage of the whole transient current through the electronic switch, prolonging the service life of the motor circuit.

Another objective of the present invention is to provide a motor circuit with power-off braking function that can use an impedance of a coil unit of the motor circuit to reduce the magnitude of the current resulting from erroneous actuations of the brake loop switch when power is being normally supplied to the motor circuit. Thus, the risks of damage to the electronic switch could be reduced and the service life of the motor circuit could be prolonged.

A motor circuit with power-off braking function according to the present disclosure includes a driving unit, a coil unit, and a braking unit. The driving unit includes a plurality of switch arms connected in parallel, with each of the plurality of switch arms having a series contact. The coil unit includes a plurality of coils and a central contact. Each of the plurality of coils includes an end connected to the series contact of one of the plurality of switch arms. The other end of each of the plurality of coils is connected to the central contact. The braking unit includes a brake loop switch coupled between the central contact of the coil unit and an end of the plurality of switch arms.

The braking unit can further include a buffering element, and the brake loop switch is coupled to the central contact through the buffering element.

The driving unit further includes a high voltage end and a low voltage end. The plurality of switch arms is connected in parallel between the high and low voltage ends. The high voltage end or the low voltage end is coupled to the brake loop switch.

The motor circuit with power-off braking function can further include an energy storage unit having a power output connected to the high voltage end. The brake loop switch is an electronic switch.

The brake loop switch includes a detecting portion and an actuating portion. The detecting portion is coupled to the high voltage end. The actuating portion is coupled between the central contact of the coil unit and one of the high voltage end or the low voltage end of the plurality of switch arms. The actuating portion is in either of an on state and an off state. The brake loop switch can be a relay.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

Figure 1:
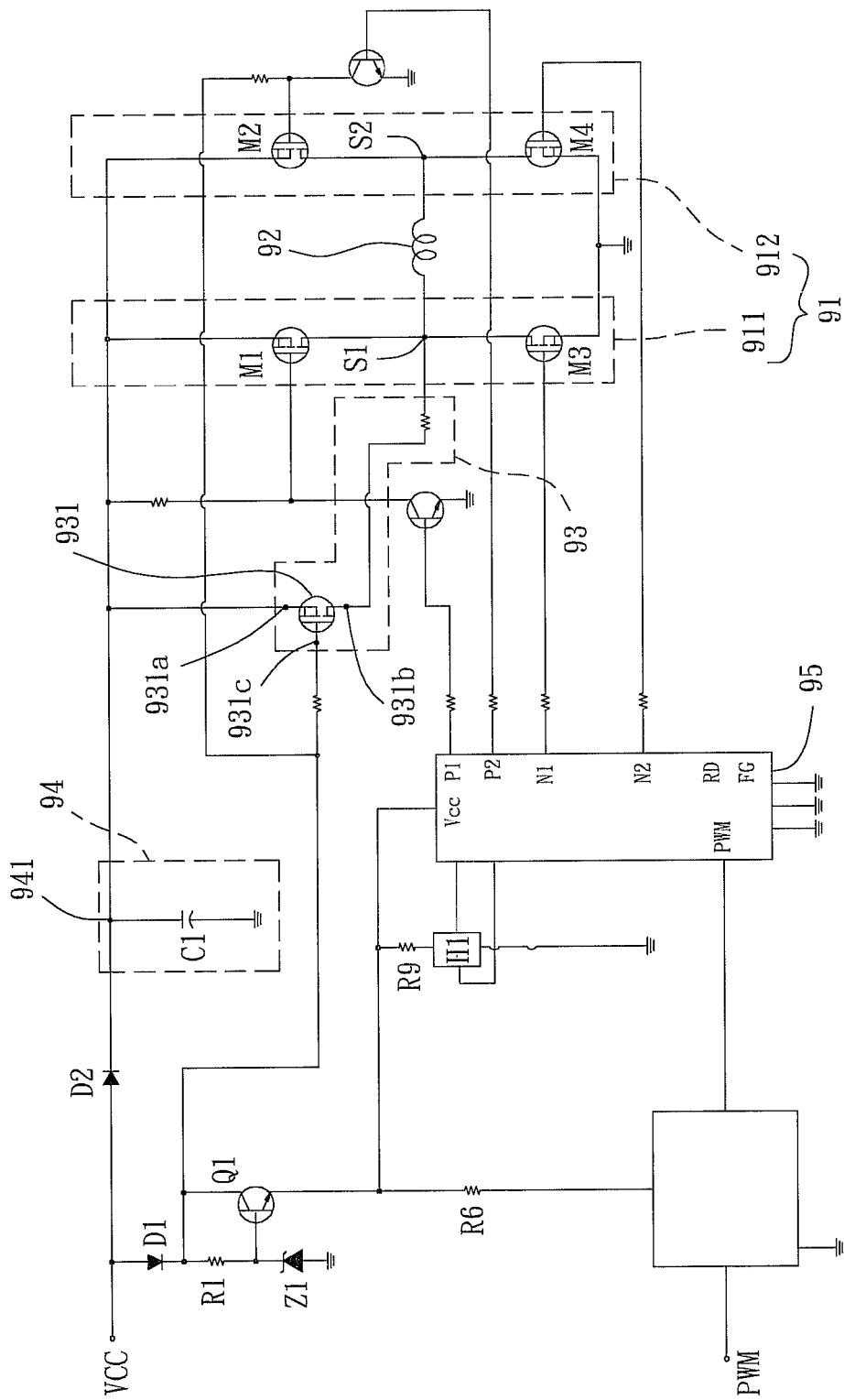
FIG. 1 shows a circuitry of a conventional motor circuit with power-off braking function.
Figure 2:
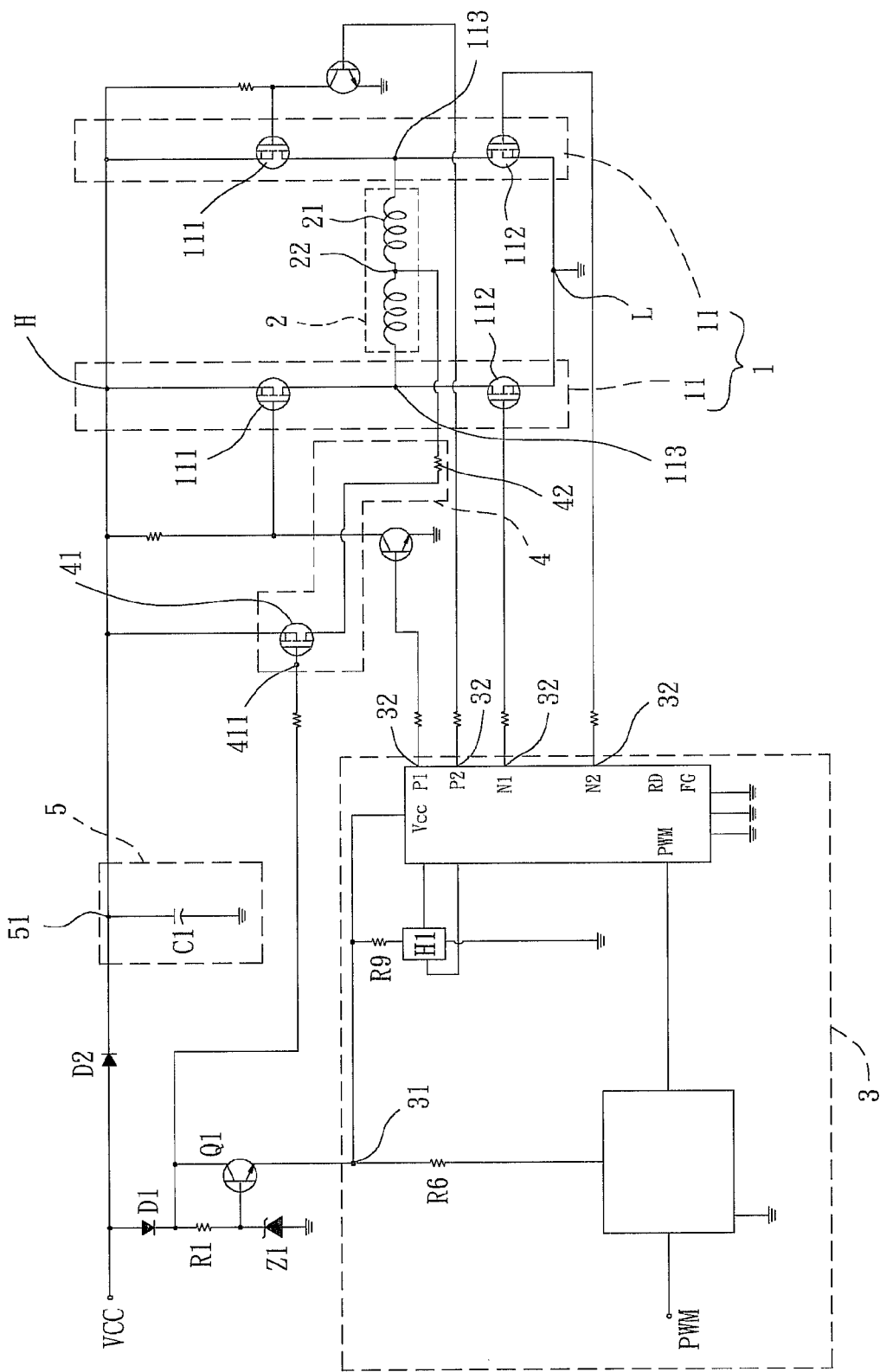
FIG. 2 shows a circuitry of a first embodiment of a motor circuit with power-off braking function according to the present invention used in a single phase motor.
Figure 3:
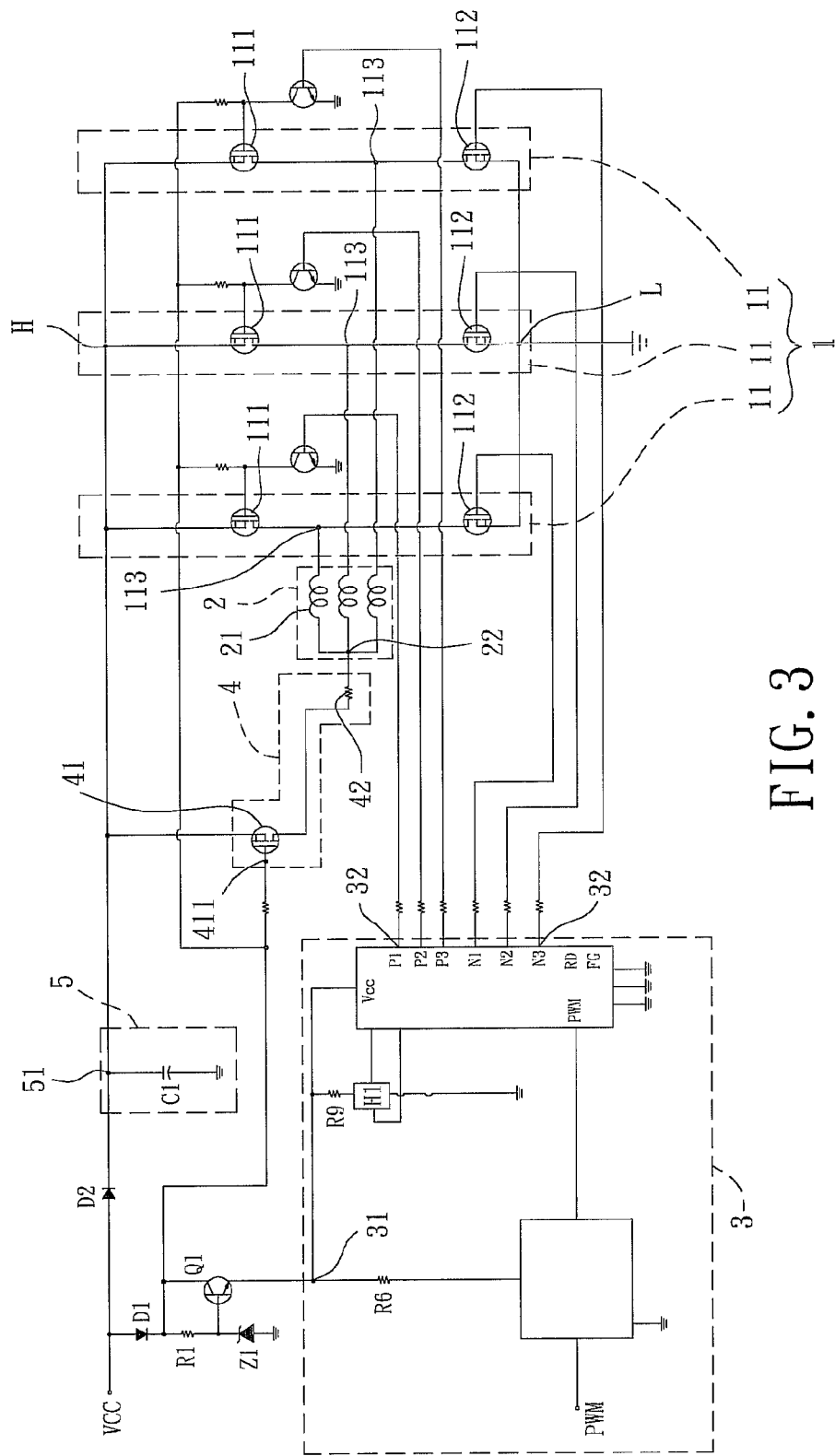
FIG. 3 shows a circuitry of the first embodiment of the motor circuit with power-off braking function according to the present invention used in a three phase motor.

FIGS. 2 and 3 show a first embodiment of a motor circuit with power-off braking function according to the present invention, with FIG. 2 showing use of the motor circuit in a single phase motor, and with FIG. 3 showing use of the motor circuit in a three phase motor. The motor circuit includes a driving unit 1, a coil unit 2, a control unit 3, a braking unit 4, and an energy storage unit 5.

The driving unit 1 includes a plurality of switch arms 11 connected in parallel between a high voltage end H and a low voltage end L. Each switch arm 11 includes an upper arm switch 111, a lower arm switch 112, and a series contact 113. The upper and lower arm switches 111 and 112 are connected in series, with the series contact 113 being a contact between the upper and lower arm switches 111 and 112. A voltage level of the high voltage end H is higher than that of the low voltage end L. The high voltage end H is coupled to a DC power source VCC. The low voltage end L is preferably a grounding point.

Specifically, each upper arm switch 111 can be a p-channel metal-oxide semiconductor field-effect transistor (p-channel MOSFET, which will be referred to "PMOS" hereinafter), and each lower arm switch 112 can be an n-channel metal-oxide semiconductor field-effect transistor (n-channel MOSFET, which will be referred to "NMOS" hereinafter). A source of the PMOS is connected to the high voltage end H. A drain of the PMOS is connected to the series contact 113. A drain of the NMOS is connected to the series contact 113. A source of the n-channel metal-oxide field-effect transistor NMOS is connected to the low voltage end L.

Figure 4:
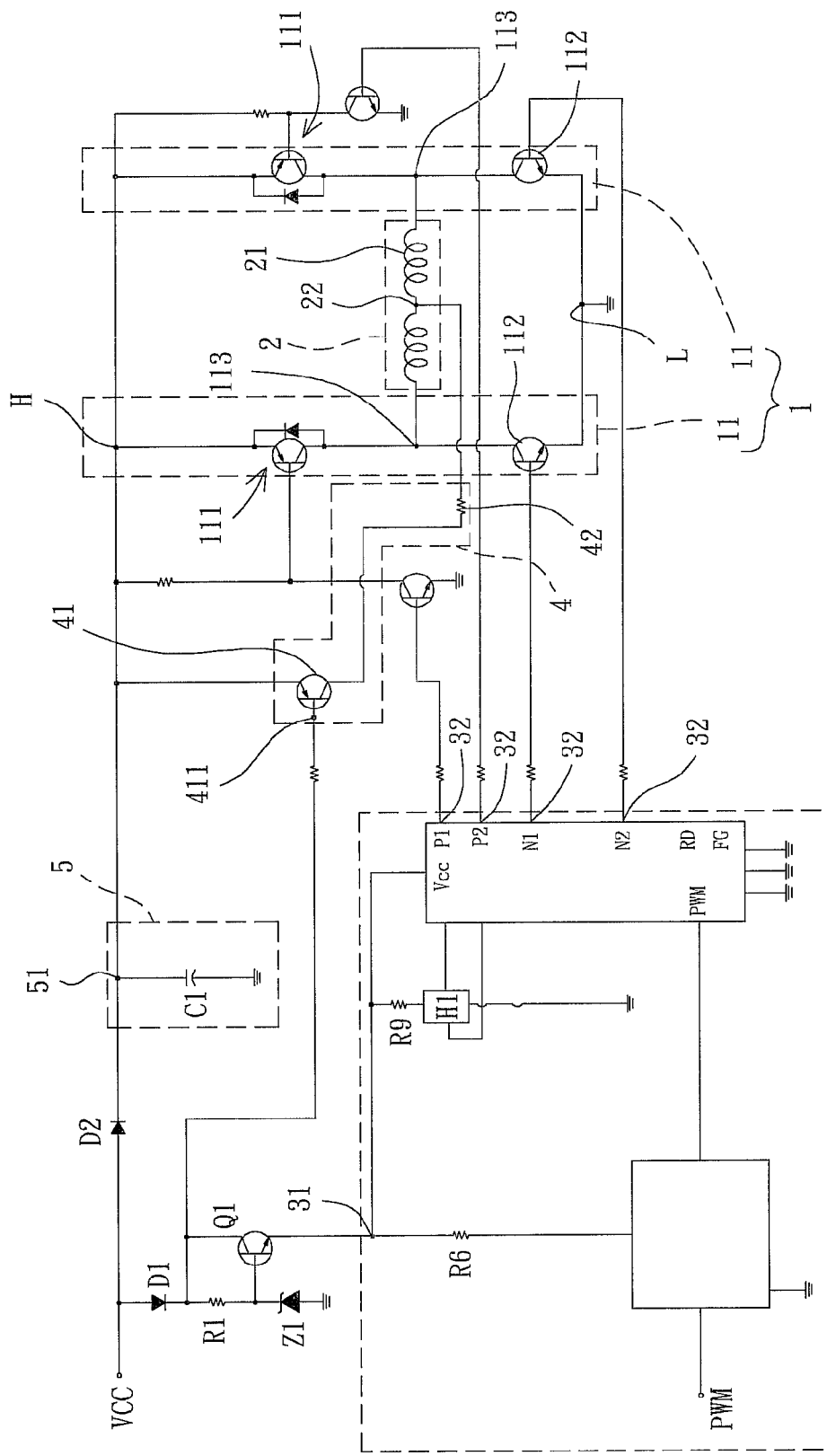
FIG. 4 shows a circuitry of the first embodiment of the motor circuit with power-off braking function according to the present invention, illustrating another example of a driving unit of the motor circuit.

In another example shown in FIG. 4, each upper arm switch 11 is comprised of a pnp bipolar junction transistor (pnp BJT) and a diode, and each lower arm switch 112 is comprised of an npn bipolar junction transistor (npn BJT). An emitter of the pnp BJT is connected to the high voltage end H. A collector of the pnp BJT is connected to the series contact 113. An anode of the diode is connected to the collector of the pnp BJT. A cathode of the diode is connected to the emitter of the pnp BJT. A collector of the npn BJT is connected to the series contact 113. An emitter of the npn BJT is connected to the low voltage end L.

The coil unit 2 includes a plurality of coils 21 and a central contact 22. The number of the coils 21 is equal to that of the switch arms 11. Each coil 21 includes an end connected to the series contact 113 of one of the switch arms 11. The other end of each coil 21 is connected to the central contact 22.

The control unit 3 includes a power input port 31 and a plurality of signal output ports 32. The power input port 31 is coupled to the DC power source VCC so that the control unit 3 can operate through the power supplied by the DC power source VCC. The number of the signal output ports 32 is equal to a sum of the numbers of the upper and lower arm switches 111 and 112 of the switch arms 11. The signal output ports 32 are respectively coupled to the upper and lower arm switches 111 and 112 to separately control the upper and lower arm switches 111 and 112 to be in either an on state or an off state. Specifically, in a case that the upper and lower switches 111 and 112 are comprised of metal-oxide semiconductor field-effect transistors (MOSFETs) or bipolar junction transistors (BJTs), the signal output ports 32 are respectively coupled to the gates of the MOSFETs or the bases of the BJTs.

The braking unit 4 includes a brake loop switch 41 coupled between the central contact 22 of the coil unit 2 and the high voltage end H. The brake loop switch 41 includes a control end 411 coupled to the DC power source VCC. The brake loop switch 41 is preferably an electronic switch, such as PMOS, with the source and the drain of the PMOS respectively coupled to the high voltage end H and the central contact 22, with the gate of the PMOS serving as the control end 411.

In another example shown in FIG. 4, the brake loop switch 41 is comprised of a pnp BJT, with the emitter and the collector of the pnp BJT respectively coupled to the high voltage end H and the central contact 22, and with the base of the pnp BJT serving as the control end 411.

Preferably, the braking unit 4 further includes a buffering element 42 so that the brake loop switch 41 is coupled to the central contact 22 through the buffering element 42. The buffering element 42 can be a resistor.

The energy storage unit 5 includes a power output 51 connected to the high voltage end H. Preferably, the energy storage unit 5 is a capacitor having an end that serves as the power output 51, with the other end of the capacitor connected to a grounding point.

FIGS. 2 and 3 show use of the motor circuit with power-off braking function according to the present invention is used in a single phase motor and a three phase motor, respectively. When the DC power source VCC supplies power normally, the control unit 3 receives the power from the DC power source VCC through the power input port 31 and outputs a high level signal or a low level signal from each signal output port 32, controlling the upper arm switch 111 of one of the switch arms 11 and the lower arm switch 112 of one of the remaining switch arms 11 to be conductive. The remaining upper arm switches 111 and the remaining lower arm switches 112 are not conductive (non-conductive). Thus, a current is generated in the coil unit 2. The current passes through the central contact 22 via the coil 21 which is connected to the conductive upper arm switch 111, and then through the coil 21 which is connected to the conductive lower arm switch 112. As a result, the two coils 21 generate an induced magnetic field.

An alternating magnetic field is created when the control unit 3 changes the flowing direction of the current in the coil unit 2 by changing the conductive/non-conductive states of the upper arm switch 111 and the lower arm switch 112. Thus, the rotor of the motor including the motor circuit according to the present invention can be driven to rotate.

On the other hand, the control unit 3 can not operate when the power from the DC power source VCC is cut off. The upper and lower arm switches 111 and 112 of each switch arm 11 are open. Since the energy storage unit 5 can release previously stored electric energy via the power output 51, the brake loop switch 41 can be maintained in the conductive state before the energy storage unit 5 runs out of electricity. Thus, the braking unit 4, the coils and a plurality of parasite diodes between the sources and drains of the upper arm switches 111 (or the diode included in each upper arm switch 111 shown in FIG. 4) form a plurality of closed loops to rapidly reduce the current in the coils 21 to zero.

By using the above circuit, a plurality of closed loops is simultaneously formed by making the brake loop switch 41 conductive, while the power from the DC power source VCC is cut off. This reliably avoids damage to an electronic switch through which the whole transient current flows during braking, prolonging the service life of the motor circuit. Furthermore, during normal power supply from the DC power source VCC, even if the brake loop unit 41 mistakenly becomes conductive due to erroneous actuation such that a surge current flows from one of the coils 21 through a conductive lower arm switch 112, the impedance of the coil 21 can reduce the intensity of the surge current to reduce the risks of damage to the conductive lower arm switch 112 by the surge current.

Figure 5:
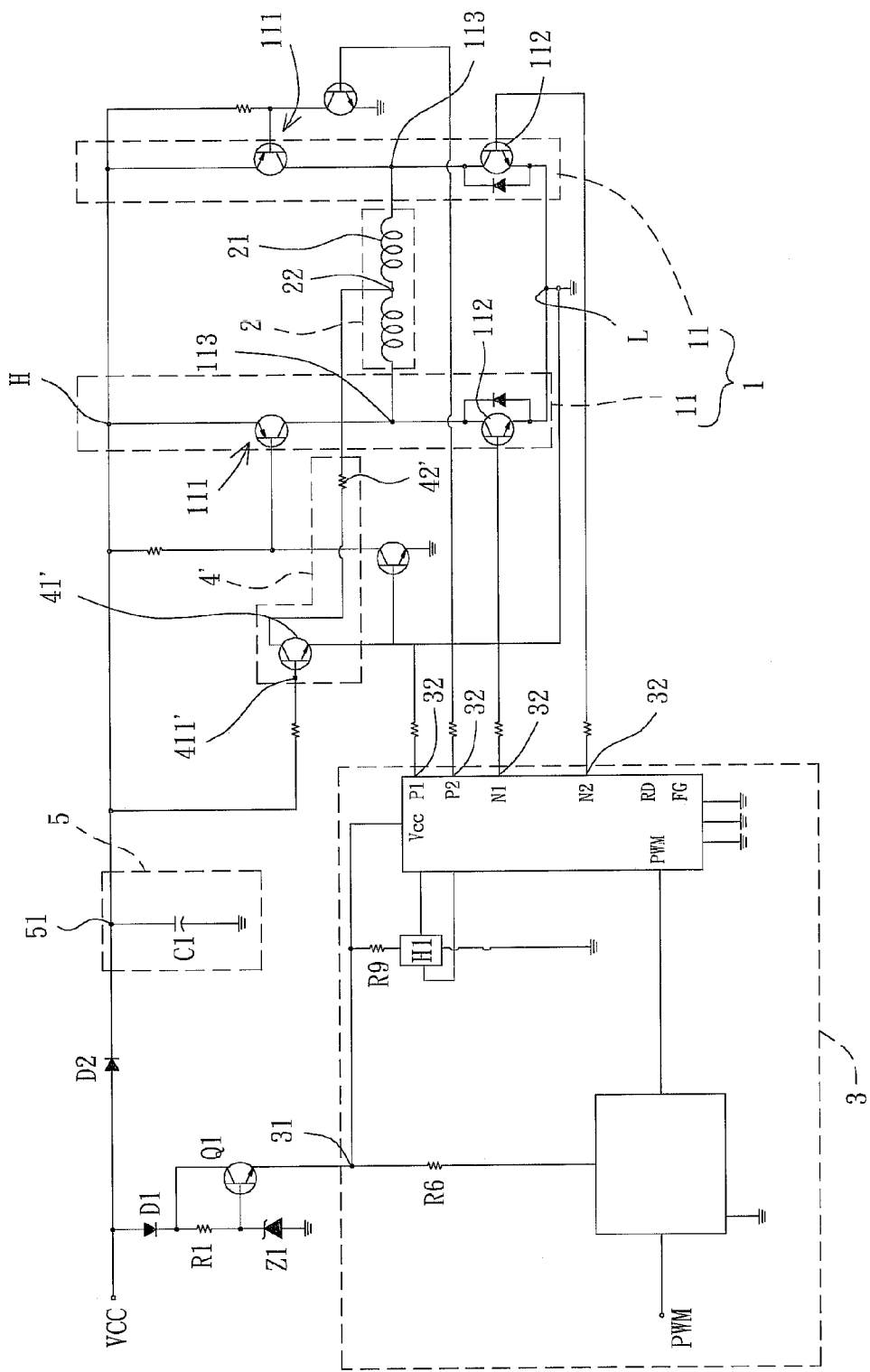
FIG. 5 shows a circuitry of a second embodiment of the motor circuit with power-off braking function according to the present invention.

FIG. 5 shows a second embodiment of the motor circuit with power-off braking function according to the present invention. In this embodiment, the braking unit 4 in the first embodiment is replaced by a braking unit 4' that also includes a brake loop switch 41'. However, the brake loop switch 41' is coupled between the central contact 22 of the coil unit 2 and the low voltage end L. Furthermore, the control end 411' of the brake loop switch 41' is coupled to the power output 51 of the energy storage unit 5. The brake loop switch 41' can be an npn BJT, with the collector and the emitter of the npn BJT respectively coupled to the central contact 22 and the low voltage end L, and with the base of the npn BJT serving as the control end 411'. Likewise, each lower arm switch 112 can be comprised of an npn BJT and a diode, with the collector of the npn BJT connected to the series contact 113, with the emitter of the npn BJT connected to the low voltage end L, with the anode of the diode connected to the emitter of the npn BJT, and with the cathode of the diode connected to the collector of the npn BJT, as shown in FIG. 5. However, each lower arm switch 112 can be formed by an NMOS. BY such an arrangement, when the power from the DC power source VCC is cut off, the energy storage unit 5 releases previously stored electric energy via the power output 51 to maintain the brake loop switch 41' in the conductive state. The braking unit 4', the coils 21, and a plurality of diodes between the sources and drains of the lower arm switches 112 form a plurality of closed loops. The second embodiment also avoids damage to a single electronic switch in a single closed loop in conventional motor circuits, prolonging the service life of the motor circuit.

Figure 6:
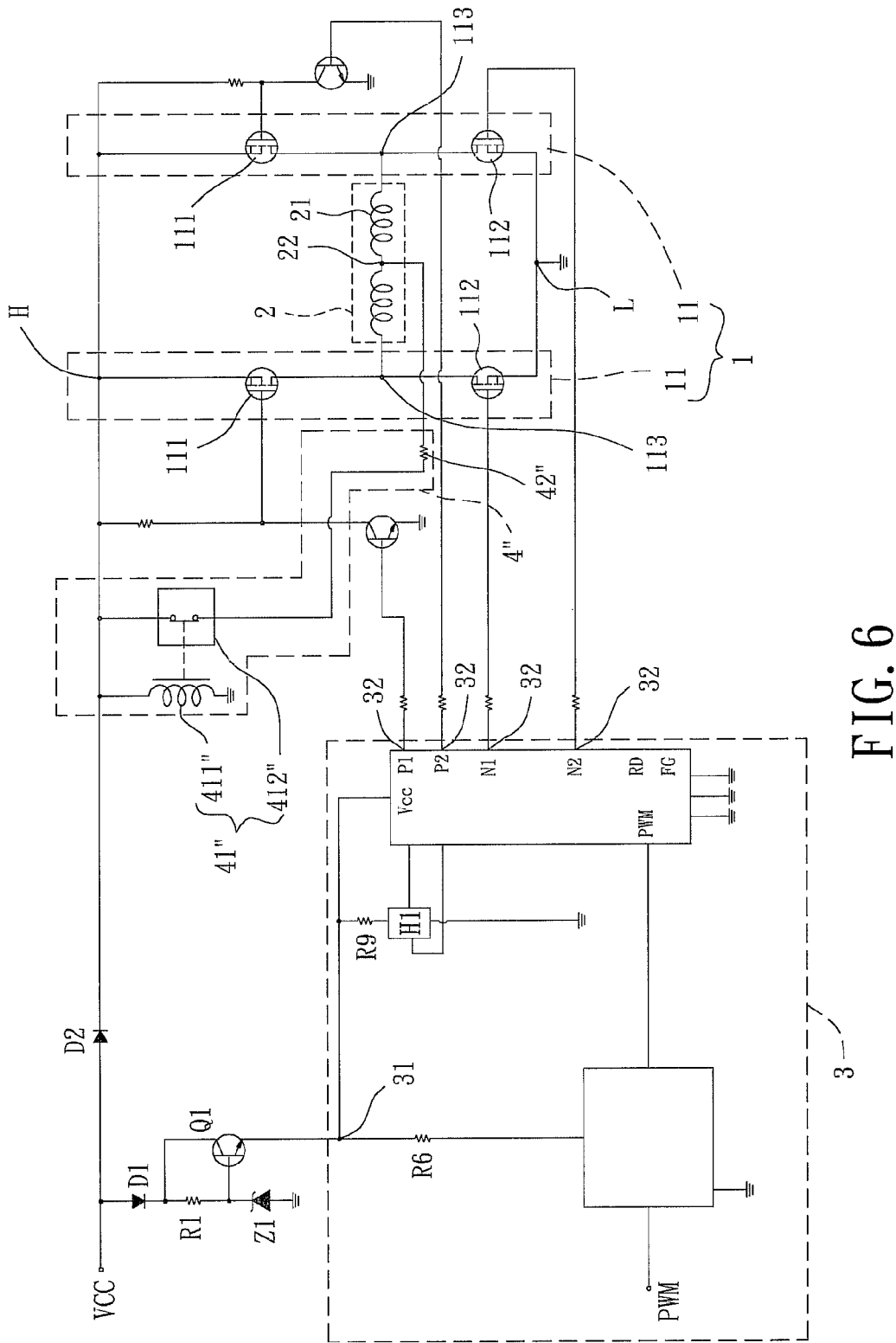
FIG. 6 shows a circuitry of a third embodiment of the motor circuit with power-off braking function according to the present invention.

FIG. 6 shows a third embodiment of the motor circuit with power-off braking function according to the present invention. In this embodiment, the braking unit 4 in the first embodiment is replaced by a braking unit 4" that also includes a brake loop switch 41" and a buffering element 42". However, the brake loop switch 41' is a normally closed element such as a normally closed relay. Specifically, the brake loop switch 41" includes a detecting portion 411" and an actuating portion 412". The detecting portion 411" is coupled to the high voltage end H to detect the voltage of the high voltage end H. The actuating portion 412" is coupled between the high voltage end H and the central contact 22. The actuating portion 412" is in either of an on state and an off state. The actuating portion 412" is in the off state when the high voltage end H contains voltage, producing small current which flows through the detecting portion 411". The actuating portion 412" is in the on state when no current flows through the detecting portion 411". Since the actuating portion 412" of the brake loop switch 41" is automatically in the on state when no current flows through the detecting portion 411", the motor circuit of the third embodiment does not have to include the energy storage unit 5 in the first embodiment. By the arrangement of the braking unit 4", when the power from the DC power source VCC is cut off, two ends of the actuating portion 412" of the brake loop switch 41" coupled to the high voltage end H and the central contact 22 maintains as a short circuit, normally maintaining the plurality of closed loops. Thus, the motor can be readily kept in the braking state once the power from the DC power source VCC is cut off, avoiding undesired rotation of the motor rotor resulting from interference by external force. Furthermore, the braking unit 4' in the second embodiment can be replaced by the braking unit 4" in which the braking unit 4" is coupled between the central contact 22 and the low voltage end L.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:
1. A motor circuit with power-off braking function, with the motor circuit comprising:
   a driving unit including a plurality of switch arms connected in parallel, with each of the plurality of switch arms having a series contact, the driving unit having a high voltage end and a low voltage end, wherein the plurality of switch arms are connected in parallel between the high voltage end and the low voltage end;
   a coil unit including a plurality of coils and a central contact, with each of the plurality of coils including an end connected to the series contact of one of the plurality of switch arms, with each of the plurality of coils including another end connected to the central contact; and
   a braking unit including a brake loop switch coupled between the central contact of the coil unit and an end of the plurality of switch arms, the brake loop switch including a detecting portion and an actuating portion, the detecting portion being coupled to the high voltage end and the actuating portion coupled between the cen- tral contact of the coil unit and one of the high voltage end or the low voltage end of the plurality of switch arms,
wherein the high voltage end or the low voltage end is coupled to the brake loop switch, and
wherein the actuating portion is in either an on state or an off state.

2. The motor circuit with power-off braking function as claimed in claim 1, wherein the braking unit further includes a buffering element, and
wherein with the brake loop switch is coupled to the central contact through the buffering element.

3. The motor circuit with power-off braking unction as claimed in claim 2, wherein the buffering element is a resistor.

4. The motor circuit with power-off braking function as claimed in claim 1, wherein the high voltage end is coupled to a DC power source,
wherein each of the plurality of switch arms includes an upper arm switch and a lower arm switch connected in series to the upper arm switch, and
wherein the series contact of each of the plurality of switch arms is located between the upper arm switch and the lower arm switch of the switch arm.

5. The motor circuit with power-off braking function as claimed in claim 4, wherein the plurality of switch arms is coupled to the high voltage end of the brake loop switch, and
wherein the brake loop switch includes a control end coupled to the DC power source.

6. The motor circuit with power-off braking function as claimed in claim 5, wherein the upper arm switch of each of the plurality of switch arms of the driving unit includes a p-channel metal-oxide semiconductor field-effect transistor,
wherein a source of the p-channel metal-oxide semiconductor field-effect transistor connected to the high voltage end, and
wherein a drain of the p-channel metal-oxide field-effect transistor is connected to the series contact of the switch arm.

7. The motor circuit with power-off braking function as claimed in claim 5, wherein the upper arm switch of each of the plurality of switch arms of the driving unit includes a pnp bipolar junction transistor and a diode,
wherein an emitter of the pnp bipolar junction transistor is connected to the high voltage end,
wherein a collector of the pnp bipolar junction transistor is connected to the series contact of the switch arm,
wherein an anode of the diode is connected to the collector of the pnp bipolar junction transistor, and
wherein a cathode of the diode is connected to the emitter of the pnp bipolar junction transistor.

8. The motor circuit with power-off braking function as claimed in claim 4, wherein the plurality of switch arms is coupled to the low voltage end of the brake loop switch, and
wherein the brake loop switch including a control end coupled to the high voltage end.

9. The motor circuit with power-off braking function as claimed in claim 8, wherein the lower arm switch of each of the plurality of switch arms of the driving unit includes an n-channel metal-oxide semiconductor field-effect transistor,
wherein a source of the n-channel metal-oxide field-effect transistor is connected to the low voltage end, and
wherein a drain of the n-channel metal-oxide semiconductor field-effect transistor is connected to the series contact of the switch arm.

10. The motor circuit with power-off braking function as claimed in claim 8, wherein the lower arm switch of each of the plurality of switch arms of the driving unit includes an npn bipolar junction transistor and a diode,
wherein an emitter of the npn bipolar junction transistor connected to the low voltage end,
wherein a collector of the npn bipolar junction transistor connected to the series contact of the switch arm,
wherein an anode of the diode connected to the emitter of the npn bipolar junction transistor, and
wherein a cathode of the diode connected to the collector of the npn bipolar junction transistor.

11. The motor circuit with power-off braking function as claimed in claim 1, wherein the brake loop switch is a relay.

* * * * *